(12) United States Patent
Rüdiger et al.

(10) Patent No.: US 6,367,647 B1
(45) Date of Patent: *Apr. 9, 2002

(54) STORAGE CONTAINER FOR LIQUEFIED GASES

(75) Inventors: Horst Rüdiger, Augsburg; Wilfried-Henning Reese, Unterschleissheim, both of (DE)

(73) Assignee: Linde Akteingesellschaft, Weisbaden (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/428,483

(22) Filed: Oct. 28, 1999

(30) Foreign Application Priority Data

Oct. 28, 1998 (DE) .......................................... 198 49 767

(51) Int. Cl.[7] .............................................. F67C 1/00
(52) U.S. Cl. .................. 220/560.04; 206/0.6; 220/564; 220/901
(58) Field of Search ................................ 220/581, 564, 220/901, 563, 88.1, 88.2, 560.06, 560.04; 206/0.6, 0.7, 0.5

(56) References Cited

U.S. PATENT DOCUMENTS

| | | | | |
|---|---|---|---|---|
| 2,973,085 A | * | 2/1961 | Nissen et al. ................ 206/0.7 |
| 3,246,789 A | * | 4/1966 | Progler ........................ 220/901 |
| 3,338,238 A | * | 8/1967 | Warncke ................ 128/205.12 |
| 3,441,164 A | * | 4/1969 | Wang ......................... 220/901 |
| 3,608,660 A | * | 9/1971 | Smith ........................ 180/69.5 |
| 3,804,292 A | * | 4/1974 | Chiti .......................... 220/88.1 |
| 3,837,527 A | * | 9/1974 | Kutik et al. ................. 220/675 |
| 3,979,005 A | * | 9/1976 | Robinson et al. ........... 220/901 |
| 4,013,190 A | * | 3/1977 | Wiggins et al. ............. 220/563 |
| 4,566,589 A | * | 1/1986 | Poschinger ................. 206/0.7 |
| 4,606,319 A | * | 8/1986 | Silva .......................... 123/525 |
| 4,676,463 A | * | 6/1987 | Tansill ..................... 244/129.2 |
| 5,323,953 A | * | 6/1994 | Adderley et al. ........... 220/581 |
| 5,704,512 A | * | 1/1998 | Falk et al. .................. 220/501 |
| 6,237,349 B1 | * | 5/2001 | Posselt et al. ............... 62/50.1 |

FOREIGN PATENT DOCUMENTS

| | | | | |
|---|---|---|---|---|
| CA | 705745 | * | 3/1965 | ................ 220/88.2 |
| DE | 4212636 A1 | | 10/1993 | |
| IT | 523663 | * | 7/1957 | ................ 220/564 |

* cited by examiner

Primary Examiner—Stephen P. Garbe
Assistant Examiner—Joseph C. Merek
(74) Attorney, Agent, or Firm—Millen, White, Zelano & Branigan, P.C.

(57) ABSTRACT

A storage tank, especially for liquefied gases, is separated into cells by numerous partitions of a material having low heat conductivity. The maximum diameter of the cells in a plane that is perpendicular to the partitions is less than 50 mm.

15 Claims, 2 Drawing Sheets

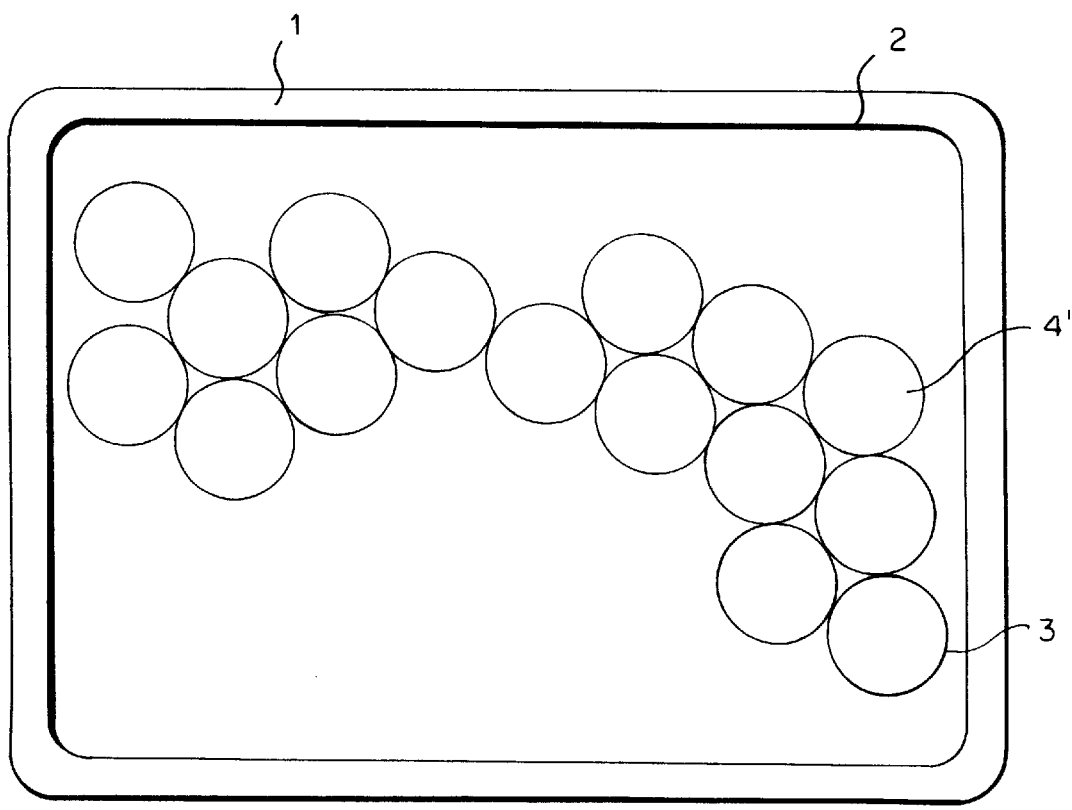

STORAGE CONTAINER FOR LIQUEFIED GASES

RELATED APPLICATION

Co-pending U.S. patent application Ser. No. 09/428,484 of Heinz Posselt et al. titled "Pressure Build-up Evaporator" filed Oct. 28, 1999, now U.S. Pat. No. 6,237,349B1, issued May 29, 2001.

FIELD OF THE INVENTION

The invention relates to a storage tank, especially for liquefied gases, which is separated into cells by a considerable number of partitions.

BACKGROUND OF THE INVENTION

In the future, in view of the emissions burden that is caused by traffic, hydrogen will be used increasingly as a fuel for motor vehicles, aircraft and ships. The storage of hydrogen on board these vehicles is suitably carried out in liquid form, since based on the low density of gaseous hydrogen, the storage capacity would otherwise be only very limited. The hydrogen is therefore cooled to about 25 K and introduced into the storage tank that is in the vehicle at a pressure of 3 to 4 bar.

If a combustion engine is used as a drive assembly, the filling pressure of 3 to 4 bar is just enough for proper operation of the engine. When fuel cells are used to power vehicles, however, at this time a hydrogen supply under a pressure of 10 bar is necessary. Storage of hydrogen at a pressure of 10 bar and a corresponding equilibrium temperature of about 31 K is disadvantageous, however, since the storage capacity clearly drops because the density of the liquid hydrogen decreases with rising temperature.

In practice, therefore, the hydrogen that is stored at a pressure of 3 to 4 bar is first compressed to 10 bar, before it is fed to the fuel cell. The pressure increase can be achieved by, for example, introducing additional gaseous hydrogen into the storage tank or by evaporating a portion of the liquid hydrogen. Such a device for pressure build-up with use of a gaslift, which carries liquid hydrogen upward into the gas chamber and on whose upper end an evaporator-heating system to evaporate the liquid hydrogen is provided, is known from, for example, DE 42 12 626 A1.

After the pressure is increased, however, the liquid and the gaseous hydrogen in the storage tank are in a state of thermal imbalance, since the liquid has a temperature of about 25 K, while in the gas atmosphere, a temperature of 31 K exists. The thermodynamic system present in the tank is therefore induced by return condensation of hydrogen gas to create a balance of the thermal ratios of gas and liquid.

The return condensation and the pressure reduction that result from this is prevented in that at least the topmost liquid layer is brought into thermal equilibrium with the gas and the latter is maintained. Heating the entire liquid is undesirable, however, for the reasons of reduced storage capacity that are mentioned above.

SUMMARY OF THE INVENTION

A feature of this invention is therefore to provide a device of the above-mentioned type that makes it possible to maintain a temperature range that exists in the liquid in the storage container.

This feature is achieved according to the invention by partitions consisting of a low heat-conduction material, the maximum diameter of the cells in a plane perpendicular to the partitions being less than 50 mm.

According to the invention, the inside of the storage container is separated into individual cells by a considerable number of partitions, by which the liquid transport inside the storage container, in a plane that is perpendicular to the partitions, is greatly limited. The interval of the individual partitions is selected so that even within the individual cells, i.e., in a plane that is parallel to the partitions, movement of liquid are suppressed. It has been shown that it is necessary for this purpose to limit the maximum expansion of cells to 50 mm.

The expansion of the cells in a plane that is perpendicular to the partitions is preferably kept even less than 10 mm, especially preferably less then 5 mm. Based on the use of partitions in the storage container and the dimensioning according to the invention of the cells that result from this, it is therefore ensured that a liquid that is stored in the storage container is kept in the temperature range that is already present or specifically created.

Heat exchange between the partial liquid amounts that are stored in adjacent cells is reduced according to the invention because the partitions consist of a low heat-conduction material. The partial liquid amounts that are stored in the individual cells are thus substantially decoupled thermally. The partitions advantageously do not tightly seal with the walls of the storage container. Consequently, the liquid in each cell can flow at the joint between the partitions and the container wall from one cell into the adjacent cell. This liquid-side compound of the individual cells makes it possible to provide common feeders and discharge pipes as well as control devices, such as, e.g., liquid level sensors, for all cells.

It has been shown that it is advantageous to provide partitions that are made of plastic or a tissue that is impregnated in resin or a similar substance, since these materials are low heat-conductivity materials, light, reasonably priced and easy to process. The partitions are either completely liquid-impermeable, or they have openings that allow only a limited passage of liquid through the partitions.

The cells advantageously have a triangular, quadrilateral or hexagonal cross-section, since, on the one hand, the storage container can be filled uniformly with the latter, and, on the other hand, such cells are relatively simple to produce. In this connection, several partitions are placed against one another, bonded with one another at certain intervals, and then the unbonded areas are non-contiguous, so that cells are produced. The use of cells with round cross-sections is also advantageous for reasons of manufacturing technology.

The partitions are preferably arranged in a basically perpendicular orientation, so that narrow, high cells are produced. In this case, the cells preferably extend from the bottom of the storage container up to a height of at least 80% of the height of the storage container, especially preferably up to a height of between 80 and 95% of the height of the storage container, so that only a small part of a header portion of the container (the remaining 5 to 20%), in which there is gas, has no internal structure.

BRIEF DESCRIPTION OF THE DRAWINGS

The invention as well as additional details of the invention are explained in more detail below based on the embodiments that are depicted diagrammatically in the drawings. Here:

FIG. 3 is a top elevation of a second embodiment of the storage container of FIG. 1.

DETAILED DESCRIPTION

Figure 1:
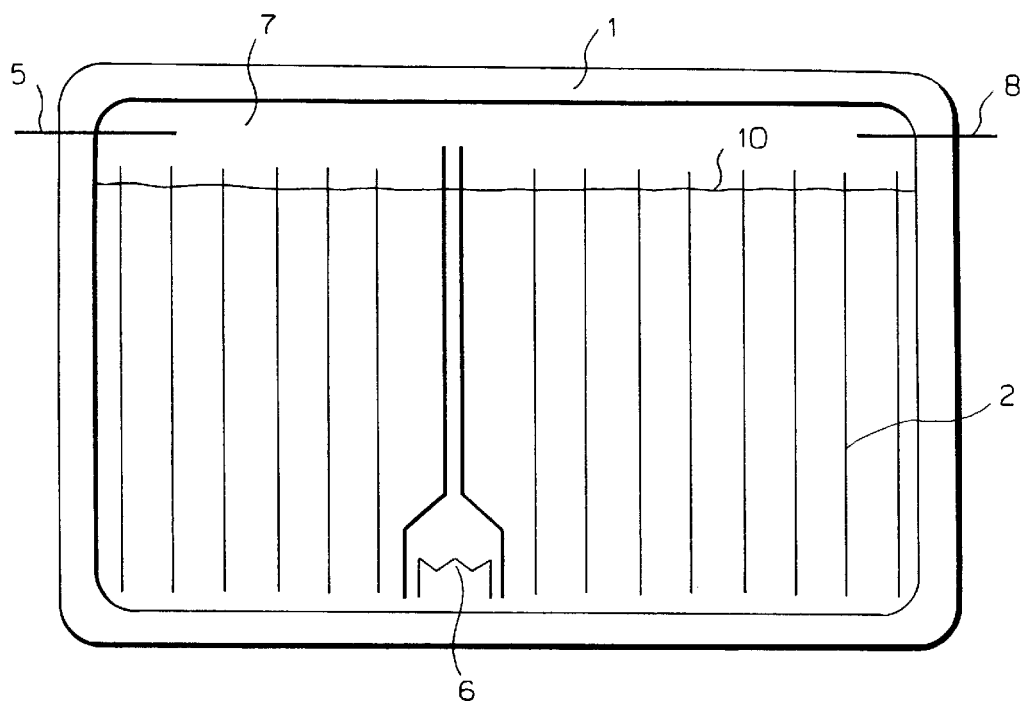
FIG. 1 shows a side elevation of a storage container according to the invention.
Figure 2:
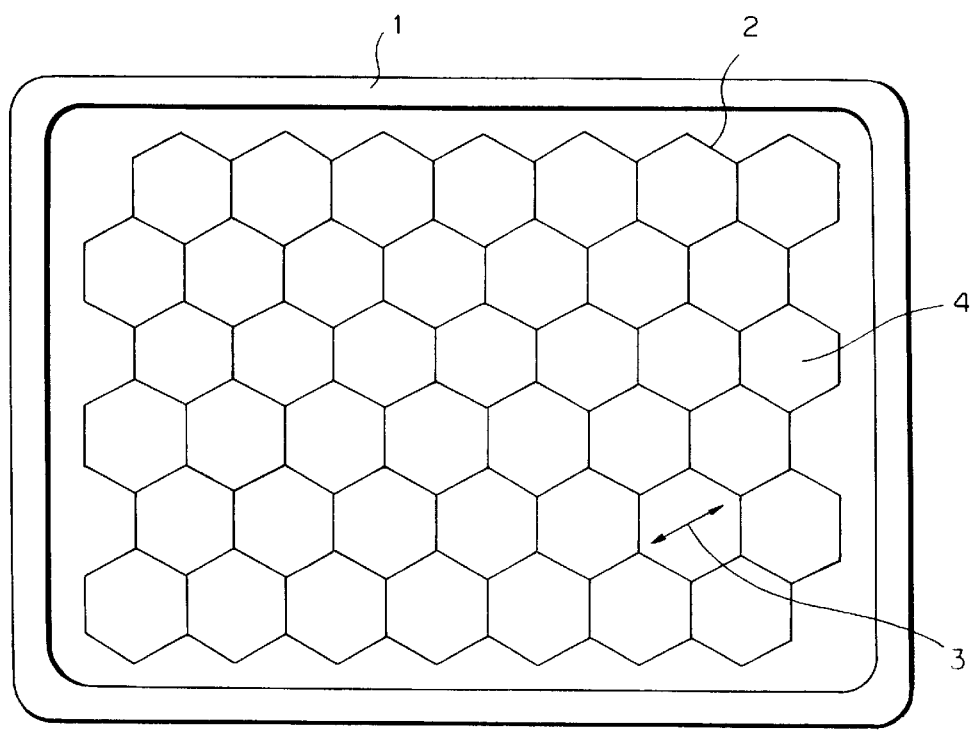
FIG. 2 is a top elevation of the storage container of FIG. 1 in top view.

FIG. 1 depicts a storage container for a hydrogen-powered vehicle with fuel cell technology, which during operation requires hydrogen under a pressure of 10 bar. Storage container 1 is separated by a considerable number of partitions 2 that are arranged to extend in a perpendicular direction. The partitions 2 are molded units bonded together to configure a honeycomb structure as is seen in the cross-section (see FIG. 2). The maximum diameter 3 of each of the honeycomb cells 4 in a plane perpendicular to partitions 2 is 6 mm. The partitions themselves consist of a knit fabric that is impregnated in resin and that is liquid-impermeable and has a low heat conductivity. FIG. 4 shows a second embodiment of The invention wherein cells 4' have a round cross section.

To store the largest possible amount of hydrogen in storage container 1, the hydrogen is first introduced at low pressure, for example 1 to 4 bar, in storage container 1 via feed line 5. During operation, the pressure is increased in container 1 by evaporating liquid hydrogen which produces hydrogen vapor or hydrogen gas.

In this connection, a portion of the liquid hydrogen with heating 6 is either heated or evaporated, so that an elevated pressure occurs in the header portion 7 due to the liquid hydrogen which has been vaporized. After initial return condensation of gaseous hydrogen, the topmost liquid layers form an insulating layer, which prevents another return condensation. In this way, it is possible to maintain in header portion 7 of the storage container, a pressure of 10 bar, which corresponds to a boiling temperature of about 31 K, while the liquid hydrogen is undercooled to about 25 K. The separation according to the invention of storage volume 1 into individual cells 4 prevents liquid movements in storage container 1, which could result in destruction of the temperature gradient in the liquid hydrogen. The gaseous hydrogen accumulating in the header portion 7 is fed to the fuel cells via line 8. As is evident from FIG. 1, there is a direct, unobstructed interface 10 between the liquid hydrogen and the gaseous hydrogen in the header space 7.

The invention thus makes it possible to store liquid hydrogen at low temperatures to achieve as large a filling amount of the storage container as possible and at the same time to make available hydrogen under high pressure of, for example, 10 bar.

What is claimed is:

1. A liquefied hydrogen storage tank having top, bottom and side walls and storing liquefied hydrogen which is normally completely in a gas phase at ambient atmospheric temperatures and pressures, the storage tank being separated into cells by numerous vertically extending partitions of a selected longitudinal extent, wherein the partitions are made of low heat conductivity material and maintain a vertical temperature gradient within the tank, the cells having a maximum diameter in a plane that is perpendicular to the extent of the partitions which is less than 50 mm and the cells having upper ends which communicate with a header space adjacent the top wall, the header space having a separate liquid hydrogen inlet for filing the tank and a gaseous hydrogen outlet for feeding gaseous hydrogen to a hydrogen utilization device, hydrogen gas at elevated pressure accumulated in the header space due to liquid hydrogen which has been vaporized for feeding hydrogen gas through the outlet to the hydrogen utilization device, the temperature gradient within the tank providing an insulating layer of liquefied hydrogen stabilized by the partitions, which insulating layer prevents return condensation of the gaseous hydrogen, there being a direct unobstructed interface between the insulating layer of liquefied hydrogen and the hydrogen gas.

2. A storage tank according to claim 1, wherein the maximum diameter of each of the cells extending in a plane perpendicular to the extent of the partitions is less than 10 mm.

3. A storage tank according to claim 2, wherein the partitions are comprised of plastic or a tissue impregnated with resin.

4. A storage tank according to claim 3, wherein the cells have a polygonal cross-section.

5. A storage tank according to claim 4, wherein the storage tank has a selected height and wherein the cells extend from the bottom of the storage tank to a height of in a range of 80 to 95% of the selected height of the storage tank.

6. A storage tank according to claim 5 in combination with a motor vehicle wherein the liquefied hydrogen is stored for use in the motor vehicle.

7. A storage tank according to claim 1, wherein the maximum diameter of each of the cells extending in a plane perpendicular to the extent of the partitions is less than 5 mm.

8. A storage tank according to claim 1, wherein the partitions are comprised of plastic or a tissue impregnated with resin.

9. A storage tank according to claim 1, wherein the cells have a polygonal cross-section.

10. A storage tank according to claim 1, wherein the storage tank has a selected height and wherein the cells extend from the bottom of the storage tank to a height of in a range of 80 to 95% of the selected height of the storage tank.

11. A storage tank according to claim 1, wherein the cells have a round cross-section.

12. A storage container according to claim 1 in combination with a motor vehicle wherein the liquefied hydrogen is stored for use in a Motor vehicle as fuel for a fuel cell which drives the motor vehicle.

13. The storage tank according to claim 1 wherein the cells are in an array which is spaced from the walls of the container.

14. The storage tank according to claim 13 wherein the cells are complexly liquid-impermeable.

15. The storage tank according to claim 13 wherein the cells have openings allowing limited passage of liquid therebetween.

* * * * *

UNITED STATES PATENT AND TRADEMARK OFFICE
CERTIFICATE OF CORRECTION

PATENT NO.    : 6,367,647 B1                                                            Page 1 of 1
DATED         : April 9, 2002
INVENTOR(S)   : Rüdiger et al.

It is certified that error appears in the above-identified patent and that said Letters Patent is hereby corrected as shown below:

<u>Column 4,</u>
Line 50, delete "Motor" and insert -- motor --.
Line 56, delete "complexly" and insert -- completely --.

Signed and Sealed this

Twenty-eighth Day of January, 2003

JAMES E. ROGAN
*Director of the United States Patent and Trademark Office*